United States Patent [19]
Frister

[11] Patent Number: 4,584,496
[45] Date of Patent: Apr. 22, 1986

[54] INTERNALLY FORCE-VENTILATED CLAW-POLE ALTERNATOR, PARTICULARLY FOR AUTOMOTIVE USE

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 693,260

[22] Filed: Jan. 22, 1985

[30] Foreign Application Priority Data

Mar. 23, 1984 [DE] Fed. Rep. of Germany ....... 3410760

[51] Int. Cl.$^4$ .............................................. H02K 9/00
[52] U.S. Cl. ................................. 310/60 R; 310/68 R; 310/168; 310/263
[58] Field of Search ............... 310/68, 68 D, 168, 263, 310/62, 63, 60, 59

[56] References Cited

U.S. PATENT DOCUMENTS

| | | | |
|---|---|---|---|
| 3,184,625 | 5/1968 | Farison | 310/59 |
| 3,450,913 | 6/1969 | Baker et al. | 310/263 X |
| 3,610,979 | 10/1971 | Thomas | 310/168 |

FOREIGN PATENT DOCUMENTS

1663153 3/1970 Fed. Rep. of Germany.

*Primary Examiner*—Donovan F. Duggan
*Attorney, Agent, or Firm*—Frishauf, Holtz, Goodman & Woodward

[57] ABSTRACT

To counteract the effects of centrifugal force on internal blades or vanes positioned in gaps (31) between adjacent claws (22, 23) of a claw-pole rotor (R) of a claw-pole alternator, a plastic sleeve (33) is fitted over the field winding (20) and has cooling fins or vanes or blades (32) projecting radially therefrom, at an inclination with respect to the axis of rotation of the rotor, and located between the inclined faces of the claw poles. The end portions (36, 37) projecting beyond the sleeve may be straight (FIG. 4) or the end portions (38, 39) may be curved (FIG. 5). Preferably, a curable casting compound is cast within the sleeve and secures the winding (20) in position, the sleeve being fitted in form of a circular bandage over the winding.

10 Claims, 5 Drawing Figures

INTERNALLY FORCE-VENTILATED CLAW-POLE ALTERNATOR, PARTICULARLY FOR AUTOMOTIVE USE

The present invention relates to an electrical alternator, and more particularly to an electrical alternator especially adapted for vehicular use, for example for combination with an automotive-type internal combustion engine (ICE), and which has a rotor so arranged that it provides for internal force ventilation and fluid cooling of the alternator.

BACKGROUND

It has previously been proposed—see German Patent Disclosure Document DE-OS No. 16 63 153, RICK, assigned to the assignee of the present application—to so design a claw-pole alternator that vanes are provided located between the claws of the claw pole, extending longitudinally at an inclination with respect to the axis of rotation of the rotor, and projecting radially from the rotor axis. Claw-pole generators of this type usually have two axial ferromagnetic pole disks which are engaged, axially, against a tubular iron core on which the field coil is wound. The claw poles are customarily unitary with the pole disks and overlap the exciter or field coil, being interdigited and essentially trapezoidal in top view. In accordance with the disclosure of the referenced German document No. 16 63 153, ventilating vanes are located between the interdigited claw poles.

The ventilating vanes provide for increased axial air flow, the hence air cooling of the internal structure of the alternator. It has been found that, at high speeds of the alternator, the centrifugal forces to which the vanes are subjected can be so high that lateral attachment of the vanes along the longitudinal axis of the claw poles is not enough to reliably retain the vanes in position. The increasing top speeds of automotive engines, thus, require an improvement in the previously designed structure.

THE INVENTION

It is an object to provide an internally ventilated alternator, particularly adapted to be driven by an ICE, in which axial ventilating vanes of fins or blades can be provided which will not come loose even under high operating speeds.

Briefly, a plastic sleeve is provided, located beneath the claw poles of the rotor and having the ventilating blades projecting therefrom. The sleeve and blades are a unitary structure. This arrangement has the advantages that the sleeve-blade combination structure is highly resistant to centrifugal forces; the sleeve, which together with the vanes is preferably made of an insulating material, can be tightly stretched over the exciter or field coil of the claw pole rotor, so that it has the effect of a bandage or roving, clamping the outer windings of the field coil radially towards the center of the rotor. This arrangement has the additional advantage that any spaces which may remain between the exciter winding and the sleeve can be easily filled with a potting or encapsulating compound, for example of the epoxy type, so that, even at very high speeds, a compact, readily balanced rotor is provided, resistant to centrifugal forces acting on all the respective components thereof.

DRAWINGS

DETAILED DESCRIPTION

Figure 1:
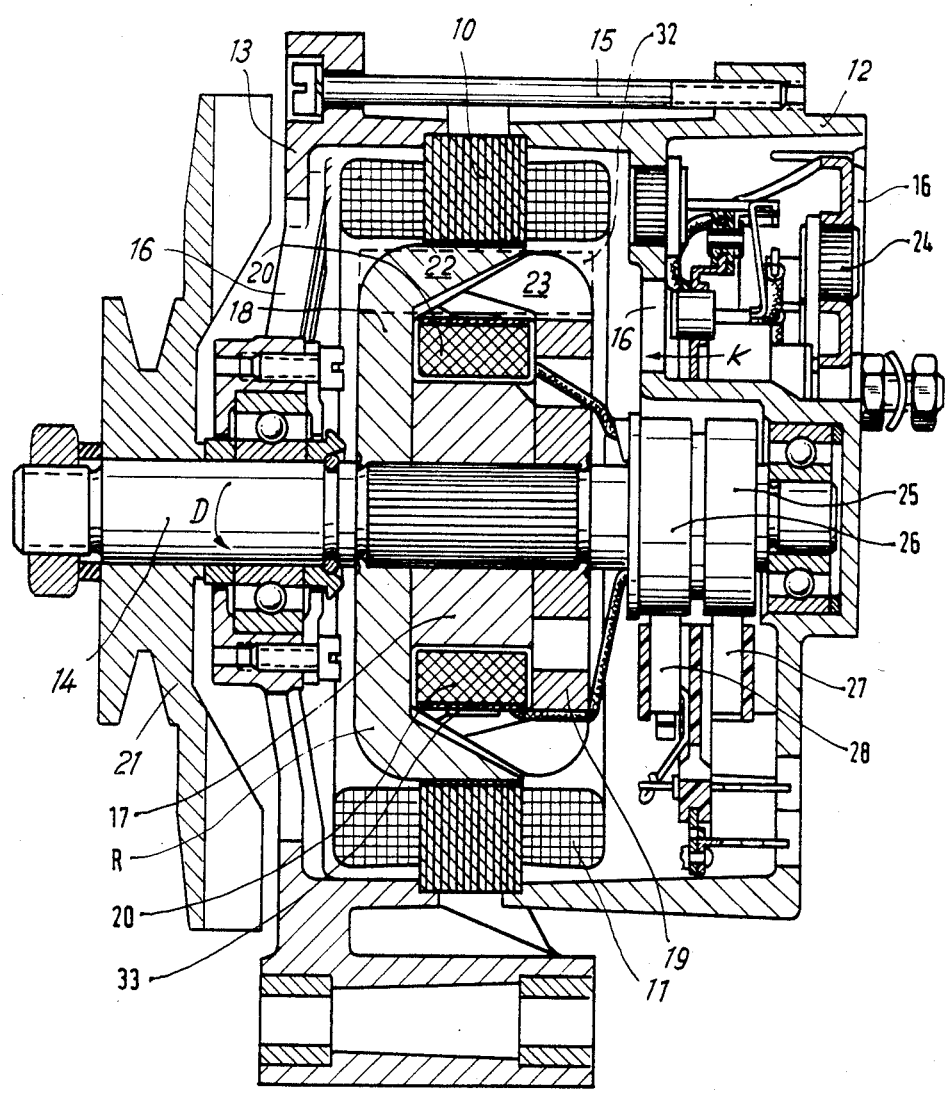
FIG. 1 is a longitudinal sectional view through a claw-pole alternator of, generally, routine construction, but additionally incorporating the subject matter of the present invention.

The generator has a stator 10, formed of essentially ring-shaped stacked laminations, on which a three-phase winding 11 is wound. The stator is retained between a cup-shaped bearing end shield or bell 12 and a drive-side end shield 13. The end shields 12, 13 are held in position, and also clamp the stator, by tension bolts 15, of which only one is shown in FIG. 1. The end shields 12, 13 are formed with a plurality of openings 16 to permit cooling air to enter the interior of the alternator, and flow in axial direction as indicated by the arrow K.

The rotor shaft 14, retained in suitable bearings in customary manner, carries a claw-pole structure R, positioned within the magnetic circuit including the stator 10. The rotor R has a soft iron core 17, secured to the rotor shaft 14 and two pole disks 18, 19 engaged at opposite sides of the rotor core 17. An exciter or field coil 20 is wound on the core 17. An external ventilating or fan wheel 21 is secured to the shaft 14, outside of the end shield 13. The ventilator or fan wheel 21 provides for axial suction to suck air through the generator in the direction of the cooling air stream K.

The claw-pole rotor R has six pairs of claw poles which are cut on the pole disks 18, 19, and then folded over the exciter coil 20. The pole disk 18, thus, has claw poles 22, and the pole disk 19 has claw poles 23, the respective claw poles being interdigited. Looked at in circumferential direction, the pole pieces fit within each other in interengaging finger shape, the pole elements becoming narrower, trapezoidally, towards their free end. Upon energization of the field winding 20, the claw poles 22, 23 will be oppositely magnetized, which induced electromagnetic energy in the stator winding 11, and can be derived therefrom in the form of direct current over rectifiers 24. Current for the field coil 20 is supplied via slip rings 25, 26 and carbon brushes 27, 28 in engagement with the slip rings.

So far, the structure of the claw-pole alternator is conventional, and any other suitable claw-pole alternator structure may be used.

Figure 2:
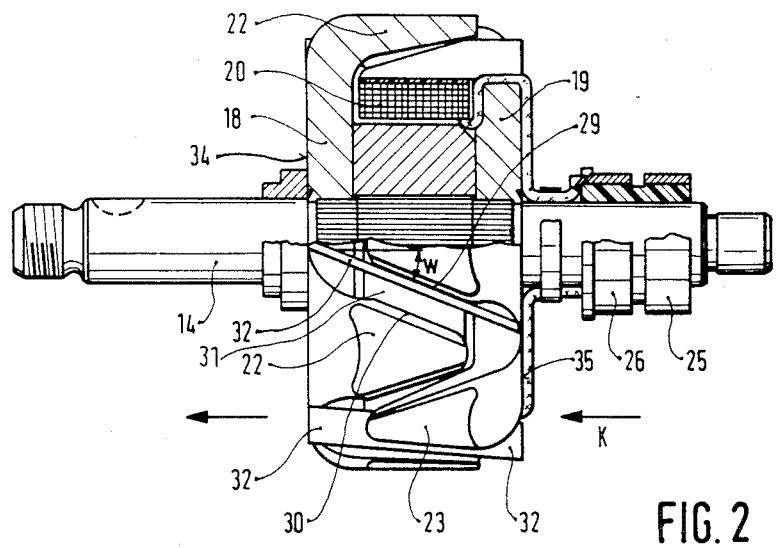
FIG. 2 is a part-axial section, part side view of the claw-pole alternator.
Figure 3:
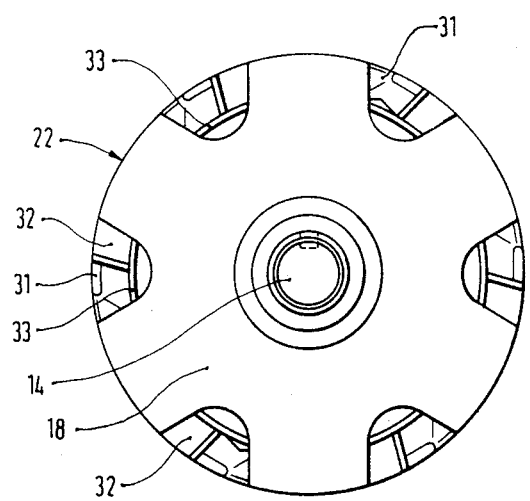
FIG. 3 is an axial end view of the alternator rotor.

FIG. 2 clearly shows two longitudinal flanks or edges 29, 30 of the claw poles; they extend approximately parallel to each other and incude gaps or spaces 31. The gaps or spaces 31 permit passing of cooling air. Additionally, the gaps and spaces magnetically insulate adjacent claw poles from each other. Air supplying vanes or blades 32 are located in each one of the six gaps 31 extending, considering the direction of rotation of the alternator, at an inclination so that the air stream K is enhanced and, at least, have minimum air resistance in the air stream K.

In accordance with the present invention, a plastic insulating sleeve is fitted over and around the winding 20 of the alternator, the vanes or blades projecting radially therefrom and being unitary with the insulating sleeve 33. The sleeve 33 is fitted over the field coil 20, previously wound on the core 17, such that it surrounds the field coil 20 in an approximately ring-shaped enclosure, similar to a bandage. Thus, the sleeve 33 retains the windings of the field 20 in position, and prevents displacement under centrifugal forces arising in operation of the alternator when coupled, for example, to an internal combustion engine (ICE). A compact sturdy rotor unit is obtained by impregnating the field winding 20 together with the sleeve 33 slipped thereover with an impregnating or potting compound such that any hollow spaces or voids which might occur within the field coil, and/or between the field coil and the sleeve 33 and the core 17, are entirely filled. A suitable hardenable or curable, initially liquid casting compound can be used, for example an epoxy-type compound.

Figure 4:
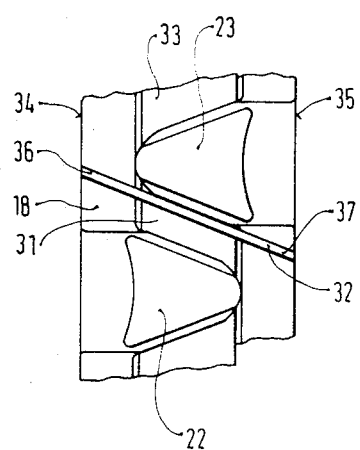
FIG. 4 is a fragmentary, developed view of an embodiment of the fan blades, located between two adjacent claw poles.

As best seen in FIGS. 2 and 4, the blades or vanes 32 extend from the outer surfaces 34 of the pole disk 18 up to the outer surface 35 of the pole disk 19. The end portions 36 of the vanes 32, projecting beyond the extent of the sleeve 33, are all preferably located in a single plane 36 at one end, and in a plane 37 at the other, located in the region of the pole disks 18, 19 and extending beyond the sleeve 33 in the space between two adjacent poles 22, 23 of the claw-pole structure.

Figure 5:
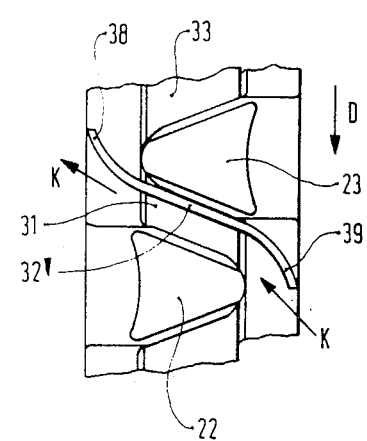
FIG. 5 is a view similar to FIG. 4, illustrating another embodiment.

The vanes or blades may be essentially straight - see FIG. 4, or may be curved - see FIG. 5. As best seen in FIG. 5, the vanes 32' may be straight in a central region where they are located between the pole shoes 22, 23, yet are bent or curved in the region of their axially projecting end portions 38', 39'. The bend may be considerable. The direction of rotation of the rotor is shown by arrow D in FIG. 5 and, upon rotation of the rotor in that direction, the air current K is enhanced to provide for improved air flow of cooling air in the space 31 between claw poles 22, 23 of the rotor R.

Various changes and modifications may be made within the scope of the inventive concept.

I claim:

1. Internally force-ventilated claw-pole alternator, particularly vehicular-type alternator, having
a stator (10, 11);
a rotor (R) rotatably retained for rotation within the stator, said rotor including a rotor shaft (14), a core (17), a winding (20) surrounding the core, two pole plates (18, 19) axially spaced from each other and engaging respective axial ends of the core, and interdigited claw poles (22, 23) extending axially towards each other from said pole plates, and leaving gaps (31) between adjacent pole plates;
and cooling blades (32) located in at least some of the gaps (31) and extending at an angle with respect to the axis of rotation of the rotor,
and comprising, in accordance with the invention,
a plastic sleeve (33) located beneath the claw poles (22, 23) of the rotor and having said blades (32) projecting radially outwardly therefrom, said blades being unitary with said sleeve.

2. Alternator according to claim 1, wherein the sleeve (33) is placed over and first around the winding (20).

3. Alternator according to claim 2, wherein the sleeve fits snugly around the winding and holds the outer portions of the winding in place.

4. Alternator according to claim 2, further including a hardenable or curable casting compound introduced beneath said sleeve and filling spaces between the winding (20) and said sleeve.

5. Alternator according to claim 1, wherein the blades (32) are unitary elements extending from one axial end surface (34) of the claw-pole rotor (R) to another axial end surface (35) of the rotor.

6. Alternator according to claim 5, wherein the blades have end portions (36, 37; 38, 39) which extend, axially, beyond the axial extent of said sleeve (33).

7. Alternator according to claim 6, wherein the axial end portions (36, 37) of the blades (32) are located in a plane which is common with a central portion of the sleeve (33).

8. Alternator according to claim 6, wherein the end portions (38, 39) of the blades (32) are curved.

9. Alternator according to claim 7, further including a hardenable or curable casting compound introduced beneath said sleeve and filling spaces between the winding (20) and said sleeve.

10. Alternator according to claim 8, further including a hardenable or curable casting compound introduced beneath said sleeve and filling spaces between the winding (20) and said sleeve.

* * * * *